US012688445B2

(12) United States Patent
     Gilligan-Lee et al.

(10) Patent No.:     US 12,688,445 B2
(45) Date of Patent:         Jul. 21, 2026

(54) SYSTEMS AND METHODS FOR BIAS BOUNDED SENSITIVITY ANALYSIS OF SYNTHETIC CONTROL MODELS

(71) Applicant: Spotify AB, Stockholm (SE)

(72) Inventors: Ciarán Gilligan-Lee, Dublin (IE);
               Thanos Vlontzos, London (GB); Jakob Zeitler, Oxford (GB)

(73) Assignee: Spotify AB, Stockholm (SE)

( * ) Notice:    Subject to any disclaimer, the term of this patent is extended or adjusted under 35 U.S.C. 154(b) by 214 days.

(21) Appl. No.: 18/427,475

(22) Filed:      Jan. 30, 2024

(65)              Prior Publication Data
     US 2025/0036980 A1      Jan. 30, 2025

(30)        Foreign Application Priority Data
     Jul. 24, 2023    (GR) ......................... 24160004733283

(51) Int. Cl.
     *G06N 7/01*          (2023.01)
(52) U.S. Cl.
     CPC ...................................... *G06N 7/01* (2023.01)
(58) Field of Classification Search
     None
     See application file for complete search history.

(56)             References Cited

U.S. PATENT DOCUMENTS 10,838,377 B1 *  11/2020  Xie ....................... G05B 13/042
2022/0414483 A1    12/2022  Shen et al.

FOREIGN PATENT DOCUMENTS

WO        2022/221743      10/2022

OTHER PUBLICATIONS

Abadie, Alberto et al., "Comparative politics and the synthetic control method", American Journal of Political Science, 59(2):495-510, 2015.
Abadie, Alberto et al., "Synthetic control methods for comparative case studies: Estimating the effect of california's tobacco control program", Journal of the American Statistical Association, 105(490):493-505, 2010.
Abadie, Alberto et al., "The economic costs of conflict: A case study of the basque country", American Economic Review, 93(1):113-132, 2003.
Athey, Susan et al., "The state of applied econometrics: Causality and policy evaluation", Journal of Economic perspectives, 31(2):3-32, 2017.
Brodersen, Kay H. et al., "Inferring causal impact using bayesian structural time-series models", Annals of Applied Statistics, 9(1):247-274, 2015.

(Continued)

*Primary Examiner* — Omar S Parra
(74) *Attorney, Agent, or Firm* — McDonnell Boehnen Hulbert & Berghoff LLP

(57)                ABSTRACT

Systems and methods for performing bias bounded sensitivity analysis of synthetic control models are provided. Bias bounds may be determined for a synthetic control model using data from the synthetic control model. If a difference between a synthetic control determined by the synthetic control model and an observed outcome are within the bias bounds, a causal effect determined using the synthetic control model may be untrustworthy. Graphical representations may be presented based, at least in part, on the observed outcome, the synthetic control, and the bias bounds.

20 Claims, 16 Drawing Sheets

(56) References Cited

OTHER PUBLICATIONS

Chernozhukov et al., "An exact and robust conformal inference method for counterfactual and synthetic controls", Journal of the American Statistical Association, 116(536): 1849-1864, 2021.

Cinelli, Carlos et al., "Making sense of sensitivity: Extending omitted variable bias", Journal of the Royal Statistical Society: Series B (Statistical Methodology), 82(1):39-67, 2020.

Cinelli, Carlos et al., "Sensitivity analysis of linear structural causal models", In International Conference onn Machine Learning, PMLR 97: 1252-1261, 2019.

Dhir, Anish et al., "Integrating overlapping datasets using bivariate causal discovery", In Proceedings of the AAAI Conference on Artificial Intelligence, vol. 34, pp. 3781-3790, 2020.

Gilligan-Lee, Ciaran et al., "Leveraging directed causal discovery to detect latent common causes in cause-effect pairs", IEEE Transactions on Neural Networks and Learning Systems, 2022, 10 pages.

Gilligan-Lee, Ciaran, "Causing Trouble", New Scientist, 246(3279):32-35, 2020.

Gilligen-Lee, Ciaran et al., "Causal inference via algebraic geometry: feasibility tests for functional causal structures with two binary observed variables", Journal of Causal Inference, 5(2), 2017, 26 pages.

Imbens, Guido et al., "Long-term causal inference under persistent confounding via data combination", arXiv preprint arXiv:2202.07234v1, 2022, 67 pages.

Imbens, Guido, "Sensitivity to exogeneity assumptions in program evaluation", American Economic Review, 93 (2): 126-132, 2003.

Jeunen, Olivier et al., "Disentangling causal effects from sets of interventions in the presence of unobserved confounders", arXiv preprint arXiv:2210.05446v1, Oct. 11, 2022, 14 pages.

Kreif, Noemi et al., "Examination of the synthetic control method for evaluating health policies with multiple treated units", Health Economics, 25(12): 1514-1528, 2016.

Kuroki, Manabu et al., "Measurement bias and effect restoration in causal inference", Biometrika, 101(2):423-437, 2014.

Liu, Jizhou et al., "Proximal causal inference for synthetic control with surrogates", arXiv preprint arXiv:2023.09527v1, 2023, 22 pages.

Miao, Wang et al., "A confounding bridge approach for double negative control inference on causal effects", arXiv preprint arXiv:1808.04945v3, Sep. 18, 2020, 47 pages.

Miao, Wang et al., "Identifying causal effects with proxy variables of an unmeasured confounder", Biometrika, 105 (4):987-993, 2018.

Nazaret, Achille et al., "On the misspecification of linear assumptions in synthetic control", arXiv preprint arXiv:2302.12777v1, Feb. 24, 2023, 22 pages.

Perov, Yura et al., "Multiverse: causal reasoning using importance sampling in probabilistic programming", In Symposium on advances in approximate bayesian inference, pp. 1-36. PMLR, 2020.

Reynaud, Hadrien et al., "D'artagnan: Counterfactual video generation", arXiv preprint arXiv:2206.01651v2, 2022, 11 pages.

Richens, Jonathan G et al., "Improving the accuracy of medical diagnosis with causal machine learning", Nature communications, 11(1): 1-9, 2020.

Rosenbaum Paul et al., "Assessing sensitivity to an unobserved binary covariate in an observational study with binary outcome", Journal of the Royal Statistical Society: Series B (Methodological), 45(2):212-218, 1983.

Shi, Claudia et al., "On the assumptions of synthetic control methods", In International Conference on Artificial Intelligence and Statistics, pp. 7163-7175. PMLR, 2022a.

Shi, Xu et al., "A selective review of negative control methods in epidemiology", arXiv preprint arXiv:2009.05641v2, Jul. 19, 2022, 23 pages.

Shi, Xu et al., "Theory for identification and inference with synthetic controls: A proximal causal inference framework", arXiv preprint arXiv:2108. 13935v4, Feb. 18, 2023, 37 pages.

Shpitser, Ilya et al., "The Proximal IDS Algorithm", arXiv preprint arXiv:2108.06818v2, 2021, 46 pages.

Tchetgen, Eric J et al., "An introduction to proximal causal learning", arXiv preprint arXiv:2009. 10982v1, 2020, 26 pages.

Van Goffrier, Graham et al., "Estimating long-term causal effects from short-term experiments and long-term observational data with unobserved confounding", arXiv preprint arXiv:2302.10625v1, 2023, 23 pages.

Veitch, Victor et al., "Sense and sensitivity analysis: Simple post-hoc analysis of bias due to unobserved confounding", Advances in Neural Information Processing Systems, 33:10999-11009, 2020.

Montzos, Athanasios et al., "Estimating the probabilities of causation via deep monotonic twin networks", arXiv preprint arXiv:2109.01904v1, Sep. 4, 2021, 10 pages.

Zeitler, Jakob et al., "Non-parametric identifiability and sensitivity analysis of synthetic control models", In 2nd Conference on Causal Learning and Reasoning, Proceedings of Machine Learning Research vol. 213:1-16, 2023.

Zhang, Junzhe et al., "Can humans be out of the loop?" In 1st Conference on Causal Learning and Reasoning, pp. 1010-1025. PMLR, 2022.

* cited by examiner

| Number of Donors | Max. Weight | Max. Donor Change | Bias Bounds | Average ATT |
|---|---|---|---|---|
| 3 | .46 | 1252 | ±2321.84 | -1726.80 |

FIG. 10

| Number of Donors | Max. Weight | Max. Donor Change | Bias Bounds | Average ATT |
|---|---|---|---|---|
| 3 | .4 | 9.1 | ±14.65 | -17.45 |

FIG. 15

SYSTEMS AND METHODS FOR BIAS BOUNDED SENSITIVITY ANALYSIS OF SYNTHETIC CONTROL MODELS

CROSS-REFERENCE TO RELATED APPLICATION(S)

This application claims priority to Greece Patent Application No. 24160004733283, filed on Jul. 24, 2023, which is hereby incorporated by reference in its entirety.

BACKGROUND

Quantifying cause and effect relationships is an important problem in many domains. One solution is to conduct a randomized controlled experiment. However, in many situations, such experiments cannot be performed. In the absence of such experiments, synthetic control models may be used to quantify the causal impact of an intervention from observational data given certain assumptions. As the assumptions underlying synthetic control models cannot be empirically tested, it is vital to conduct a formal, and theoretically grounded sensitivity analysis to determine robustness of the causal estimate to violations of these assumptions.

SUMMARY

In general terms, this disclosure is directed to systems and methods for bias bounded sensitivity analysis of synthetic control models. Bias bounds may be determined for a synthetic control model using data from the synthetic control model. If a difference between a synthetic control determined by the synthetic control model and an observed outcome are within the bias bounds, a causal effect determined using the synthetic control model may be untrustworthy. Graphical representations may be presented based, at least in part, on the observed outcome, the synthetic control, and the bias bounds.

In a first aspect, a system for determining a causal effect using a synthetic control model is provided. The system includes one or more processors and one or more computer-readable storage devices storing data instructions. When the data instructions are executed by the processors, it causes the system to receive a selection of one or more donors, train a synthetic control model on timeseries data associated with the donors, compute a bias for a synthetic control from the synthetic control model, and cause a visual output device of a computing device to present a graphical representation. Each donor is associated with timeseries data. The timeseries data comprises data before and after an intervention. When the synthetic control model is trained, the synthetic control model includes one or more learned weights. Each learned weight is associated with one of the donors. The graphical representation is based, at least in part, on an observed outcome, the synthetic control, and the bias.

In a second aspect, a method for determining a causal effect using a synthetic control model is provided. A selection of a first one or more donors is received. Each donor is associated with timeseries data that includes data before and after an intervention. The synthetic control model is trained on the timeseries data associated with the first one or more donors. When trained, the synthetic control model includes one or more learned weights. Each learned weight is associated with a donor in the first one or more donors. Bias bounds are computed for a synthetic control from the synthetic control model. A visual output device presents a graphical representation based, at least in part, on an observed outcome, the synthetic control, and the bias bounds.

In a third aspect, a non-transitory computer-readable medium is provided. The non-transitory computer-readable medium has data instructions stored thereon that when executed by one or more processors cause the processors to receive a selection of one or more donors, train a synthetic control model on timeseries data associated with the donors, compute bias bounds for a synthetic control from the synthetic control model, and cause a visual output device of a computing device to present a graphical representation. Each donor is associated with timeseries data. The timeseries data comprises data before and after an intervention. When the synthetic control model is trained, the synthetic control model includes one or more learned weights. Each learned weight is associated with one of the donors. The graphical representation is based, at least in part, on an observed outcome, the synthetic control, and the bias bounds.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 10 illustrates a table including data from a synthetic control model in a first scenario.

FIG. 15 illustrates a table including data from a synthetic control model in a second scenario.

DETAILED DESCRIPTION

Figure 1:
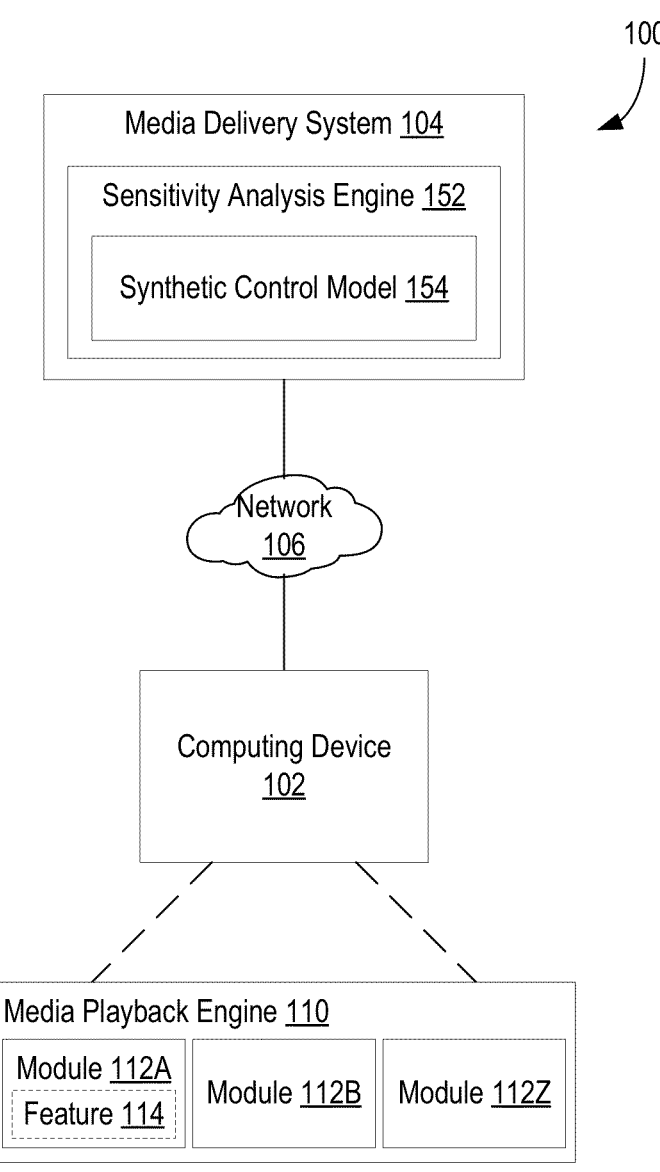
FIG. 1 illustrates a schematic block diagram of an example media playback system for performing bias bounded sensitivity analysis of synthetic control models.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like.

As briefly described above, embodiments of the present disclosure are directed to systems and methods for bias bounded sensitivity analysis of synthetic control models. While described in the context of a synthetic control model for use in software experimentation—such as determining an effect of a new feature in a media playback application, for example—the systems and methods described herein are applicable in any context in which a synthetic control model may be used.

In example aspects, a synthetic control model is trained to estimate a causal effect. Bias bounds may be computed for the synthetic control model based on an assumption that the synthetic control model includes the most important latent cause, and any latent cause not considered when training the synthetic control model will at most be as impactful as the most important latent cause. The bias bounds may be used to determine a trustworthiness of a causal effect determined using the synthetic control model by comparing the bias bounds to a difference between a synthetic control of the synthetic control model and an observed outcome.

Turning now to FIG. 1, an example media playback system 100 for performing bias bounded sensitivity analysis of a synthetic control model is shown. The system 100 includes a media delivery system 104 and a computing device 102. While only one computing device 102 is illustrated, alternative embodiments may include a plurality of computing devices 102. The media delivery system 104 includes a sensitivity analysis engine 152 which includes a synthetic control model 154. The synthetic control model 154 may be used to estimate an effect of, e.g., adding or presenting a new feature 114 within a module 112A of a media playback engine 110. To do this, the synthetic control model 154 may be trained using data associated with one or more donors. These donors may be one or more modules 112B, 112Z within the media playback engine 110 that are similar to the module 112A but to which the new feature 114 was not added.

Once the synthetic control model 154 is trained, the sensitivity analysis engine 152 performs sensitivity analysis on the synthetic control model 154 to determine trustworthiness of the estimated effect using the synthetic control model 154 to violations of assumptions that were made in training the synthetic control model 154. Using the method described herein, the sensitivity analysis engine determines bias bounds for the synthetic control model 154.

If an average difference between an observed outcome and a synthetic control output by the synthetic control model 154 is within the bias bounds, the effect estimated using the synthetic control model may be untrustworthy. This is because if the average difference between the observed outcome and the synthetic control is within the bias bounds, it is possible that with the worst possible bias, the average difference between the observed outcome and the synthetic control could be either positive or negative and, therefore, the effect of adding the new feature is indeterminate. For example, if the average difference between the observed outcome and the synthetic control is 500, but the bias bounds is ±1000, then the range for the average difference between the observed outcome and the synthetic control is between −500 to 1500. Because both a positive effect and a negative effect are within the range for the average difference between the observed outcome and the synthetic control, the effect of adding the new feature is indeterminate. In such a case, a new set of donors may be selected and the synthetic control model 154 may be retrained on the new set of donors. Alternatively, if the average difference between the observed outcome and the synthetic control output by the synthetic control model 154 is outside of the bias bounds, the effect estimated using the synthetic control model may be trustworthy.

Figure 2:
FIG. 2 illustrates an example timeline of an addition of an additional feature to a module of a media playback application.

FIG. 2 illustrates a timeline of an addition of a new feature within a media playback application. During a first period P1, the media playback application has a plurality of modules 112. At an intervention I, a new feature 114 is added to the module 112A. Data on the use of the media playback application and the specific modules 112 may be collected during the period P1 and after the intervention I during a period P2. For example, the data collected could be an amount of time that users use the different modules during each of the periods P1, P2.

As explained herein, a synthetic control model may be trained using the collected data, with the modules 112B, 112Z being used as donors to predict a synthetic control that represents what would have happened with the module 112A during the period P2 if the new feature 114 had not been added. Using the example above, the synthetic control could represent an amount of time that users would have used the module 112A if the new feature 114 had not been added. This synthetic control can then be compared to the observed outcome that occurs during the period P2—i.e., the observed amount of time that users used the module 112A—to determine the effect of the intervention I—i.e., the addition of the new feature 114.

Figure 3:
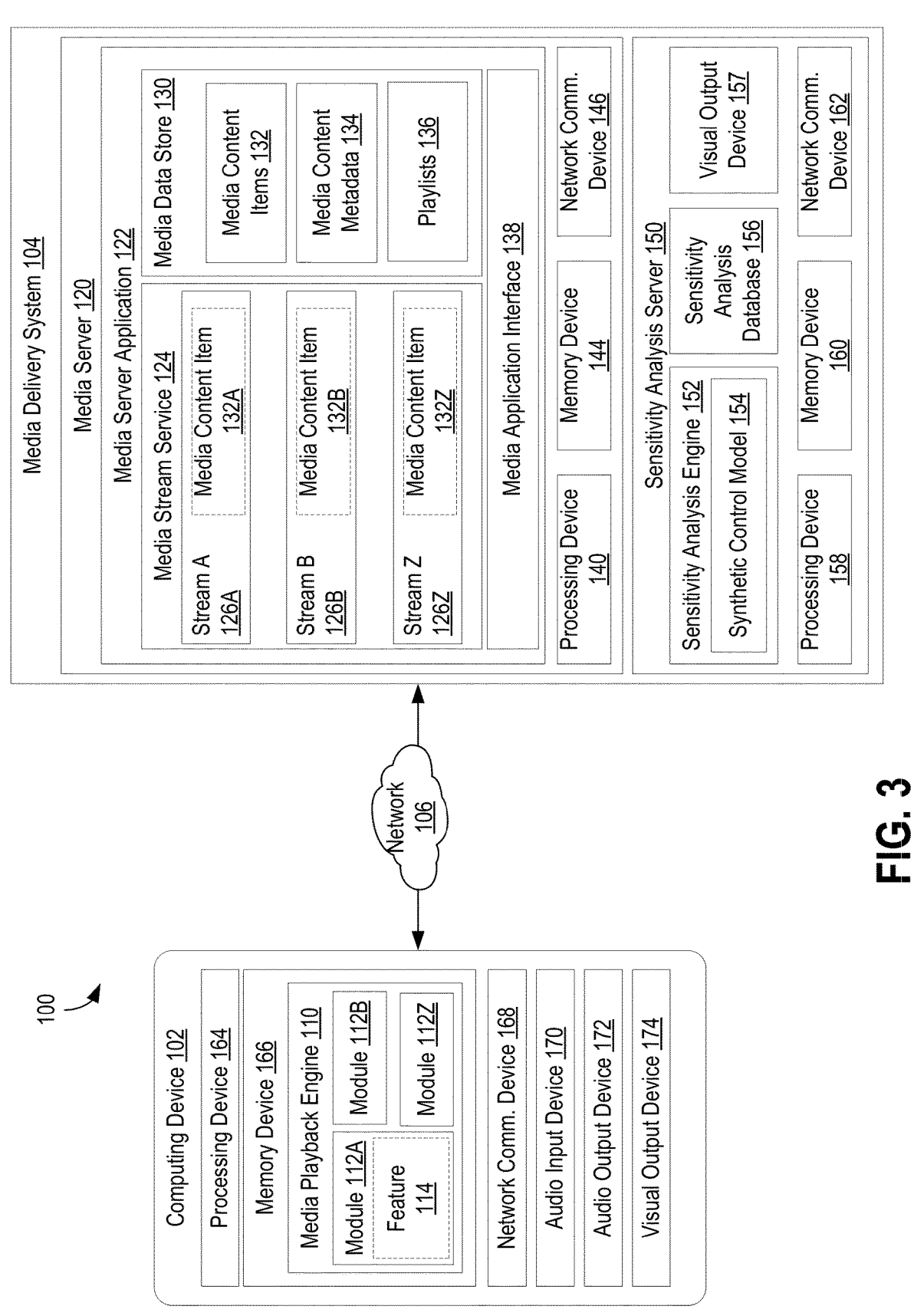
FIG. 3 illustrates a schematic block diagram of another example of a media playback system shown in FIG. 1.

FIG. 3 illustrates a schematic block diagram illustrating another example of the media playback system 100 shown in FIG. 1. In this example, the media playback system 100 includes the computing device 102 and the media delivery system 104. The network 106 is also shown for communication between the computing device 102 and the media delivery system 104.

As described herein, the computing device 102 operates to play media content items using a media playback engine that includes multiple modules 112, which may include features 114. In some embodiments, the computing device 102 operates to play media content items 132 that are provided (e.g., streamed, transmitted, etc.) by a system remote from the computing device 102 such as the media delivery system 104, another system, or a peer device. Alternatively, in some embodiments, the computing device 102 operates to play media content items stored locally on the computing device 102. Further, in at least some embodiments, the computing device 102 operates to play media content items that are stored locally as well as media content items provided by remote systems.

In some embodiments, the computing device 102 includes a processing device 164, a memory device 166, a network communication device 168, an audio input device 170, an audio output device 172, and a visual output device 174. In the illustrated example, the memory device 166 includes the media playback engine 110 and its modules 112 and the modules' features 114. Other embodiments of the computing device 102 include additional, fewer, or different components. Examples of computing devices include a smartphone, a smart speaker, and a computer (e.g., desktop, laptop, tablet, etc.).

In some embodiments, the processing device 164 comprises one or more processing devices, such as central processing units (CPU). In other embodiments, the processing device 164 additionally or alternatively includes one or more digital signal processors, field-programmable gate arrays, or other electronic circuits. In some embodiments, the processing device 164 includes at least one processing device that can execute program instructions to cause the at least one processing device to perform one or more functions, methods, or steps as described herein.

The memory device 166 operates to store data and program instructions. In some embodiments, the memory device 166 stores program instructions for the media playback engine 110 that enables playback of media content items received from the media delivery system 104, and for the modules 112 and their features 114. As described herein, the media playback engine 110 is configured to communicate with the media delivery system 104 to receive one or more media content items—e.g., through the media content streams 126 (including media content streams 126A, 126B, and 126Z).

The memory device 166 includes at least one memory device. The memory device 166 typically includes at least some form of computer-readable media. Computer readable media include any available media that can be accessed by the computing device 102. By way of example, computer-readable media can include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be accessed by the computing device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The network communication device 168 is a device that operates to communicate data across the network 106. The network communication device 168 allows the computing device 102 to communication with remote devices, such as with the media server 120 and the sensitivity analysis server 150 of the media delivery system 104. Examples of the network communication device 168 include wired and wireless data communication devices, such as a cellular, WIFI, BLUETOOTH™, LoRa, and wired (e.g., Ethernet) communication device.

Some embodiments include an audio input device 170 that operates to receive audio input, such as voice input provided by the user. The audio input device 170 typically includes at least one microphone. In some embodiments, the audio input device 170 detects audio signals directly, and in other embodiments, the audio input device 170 communicates with another device that detects the audio signals (such as through a Bluetooth-connected microphone).

The audio output device 172 operates to output audible sounds, such as the media content and other audio outputs, such as audio cues. In some embodiments, the audio output device 172 generates media output to play media content. Examples of the audio output device 172 include a speaker, an audio output jack, and a Bluetooth transceiver (such as for communication with a Bluetooth-connected speaker). In some embodiments, the audio output device 172 generates an audio output directly, and in other embodiments, the audio output device 172 communicates with another device that generates the audio output. For example, the audio output device 172 may transmit a signal through an audio output jack or a Bluetooth transmitter that can be used to generate the audio signal by a connected or paired device such as headphones or a speaker.

Some embodiments also include a visual output device 174. The visual output device 174 includes one or more light-emitting devices that generate a visual output. Examples of the visual output device 174 includes a display device (which can include a tough-sensitive display device) and lights such as one-or-more light-emitting diodes (LEDs).

Still with reference to FIG. 3, the media delivery system 104 includes one or more computing devices, such as the media server 120 that provides media content items 132 to the computing device 102, and the sensitivity analysis server 150 that trains a synthetic control model 154 and performs sensitivity analysis on the model 154. Each of the media server 120 and the sensitivity analysis server 150 can include multiple computing devices in some embodiments. Although shown as separate servers, the media server 120 and the sensitivity analysis server 150 may be the same server.

In some embodiments, the media delivery system 104 operates to transmit media content items 132 to one or more media playback devices such as the computing device 102.

In this example, the media server 120 comprises a media server application 122, a processing device 140, a memory device 144, and a network communication device 146. The processing device 140, memory device 144, and network communication device 146 may be similar to the processing device 164, memory device 166, and network communication device 168 respectively, which have been previously described.

In some embodiments, the media server application 122 operates to stream music or other audio, video, or other forms of media content. The media server application 122 includes a media stream service 124, a media data store 130, and a media application interface 138.

The media stream service 124 operates to buffer media content such as media content items 132 (including 132A, 132B, and 132Z) for streaming to one or more streams 126 (including 126A, 126B, and 126Z).

The media application interface 138 can receive requests or other communication from the media playback devices (such as the computing device 102) or other systems, to retrieve media content items from the media delivery system 104. For example, in FIG. 3, the media application interface 138 receives communications from the media playback engine 110 of the computing device 102.

In some embodiments, the media data store 130 stores media content items 132, media content metadata 134, and playlists 136. The media data store 130 may comprise one or more databases and file systems. Other embodiments are possible as well. As noted above, the media content items 132 may be audio, video, or any other type of media content, which may be stored in any format for storing media content. For example, media content items 132 may be songs, audiobooks, podcasts, or advertisements.

The media content metadata 134 operates to provide information associated with the media content items 132. In some embodiments, the media content metadata 134 includes one or more of title, artist, lyrics, album name, length, genre, mood, era, or other media metadata, as described herein.

The playlists 136 operate to identify one or more of the media content items 132. In some embodiments, the playlists 136 identify a group of the media content items 132 in a particular order. In other embodiments, the playlists 136 merely identify a group of the media content items 132 without specifying a particular order. Some, but not necessarily all, of the media content items 132 included in a particular one of the playlist 136 are associated with a common characteristic such as a common genre, mood, or era.

In this example, the sensitivity analysis server 150 includes a sensitivity analysis engine 152 that has a synthetic control model 154, a sensitivity analysis database 156, a visual output device 157, a processing device 158, a memory device 160, and a network communication device 162.

In some embodiments, any one or more of the functions, methods, and operations described herein as being performed by the sensitivity analysis server 150—or components of the sensitivity analysis server 150, such as the sensitivity analysis engine 152—can alternatively be performed by the computing device 102. This may include embodiments where the media delivery system 104 does not include a sensitivity analysis server 150 and embodiments where the sensitivity analysis server 150 cooperates with the computing device 102 and the functions are split between those components.

The sensitivity analysis engine 152 can operate on a single computing device, or by cooperation of multiple computing devices. For example, the sensitivity analysis engine 152 can operate solely on the computing device 102 or solely on the sensitivity analysis server 150. Alternatively, portions of the sensitivity analysis engine 152 can be performed by one or more other computing devices, such as by data communication between the computing device 102 and the media delivery system 104. In the example shown in FIG. 3, the media delivery system 104 includes the sensitivity analysis engine 152. The sensitivity analysis engine 152 can perform any one or more of the operations described herein, such as with reference to FIG. 4.

The processing device 158, memory device 160, and network communication device 162 may be similar to the processing device 164, memory device 166, and network communication device 168 respectively, which have each been previously described.

In various embodiments, the network 106 includes one or more data communication links, which may include multiple different types. For example, the network 106, can include wired and/or wireless links, including BLUETOOTH™, ultra-wideband (UWB), 802.11, ZigBee, cellular, LoRa, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 3 illustrates only a single computing device 102 in communication with a single media delivery system 104, in accordance with some embodiments, the media delivery system 104 can support the simultaneous use of multiple computing devices 102. Additionally, the computing device 102 can simultaneously access media content from multiple media delivery systems 104.

Figure 4:
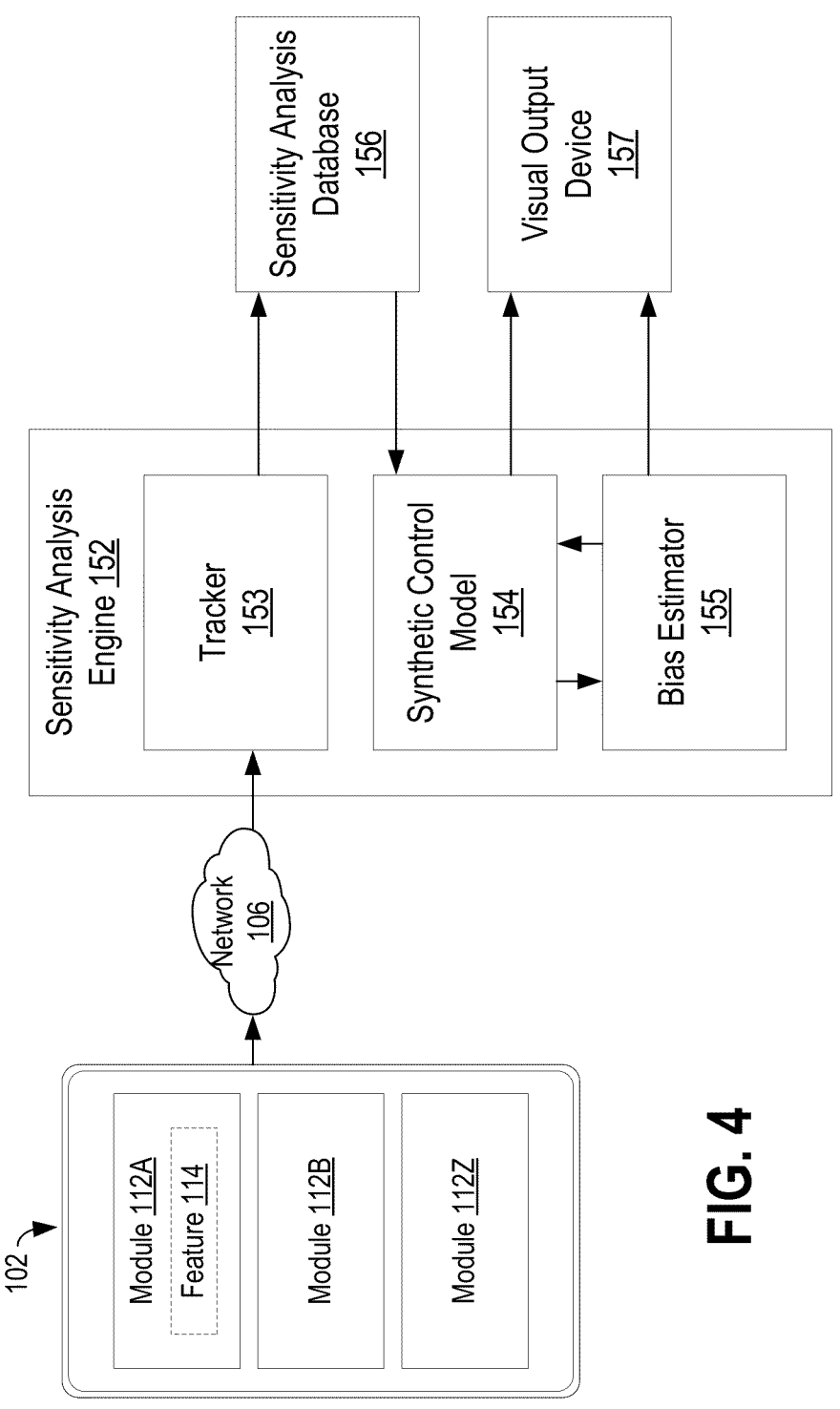
FIG. 4 illustrates a schematic block diagram of an embodiment of a sensitivity analysis engine.

FIG. 4 illustrates an example embodiment of a sensitivity analysis engine 152. In the illustrated embodiment, the sensitivity analysis engine 152 includes a tracker 153, a synthetic control model 154, and a bias estimator 155. The sensitivity analysis engine may also be connected with a sensitivity analysis database 156 and a visual output device 157. The sensitivity analysis engine 152 may also communicate with a computing device 102 over a network 106. The computing device 102 may have a plurality of modules 112, which may include a feature 114. Although not depicted in FIG. 4, the modules 112 may be part of a media playback engine.

The sensitivity analysis engine 152 may operate to collect data from the computing device 102 for training the synthetic control model 154. This data may be timeseries data including data from a first period before an intervention and from a second period after the intervention. For example, the tracker 153 may collect timeseries data from the computing device 102 relating to the usage of the modules 112, such as a number of minutes each module 112 is used. Like as is shown in FIG. 2, a feature 114 may be added to one of the modules 112A on the computing device 102. The tracker 153 may collect timeseries data relating to the usage of the modules 112 both before the feature 114 is added and after the feature 114 is added. This data may be stored by the tracker 153 in the sensitivity analysis database 156.

Using the data collected on the usage of the modules 112, the synthetic control model 154 may be trained to determine an effect on a target. The synthetic control model may generate a synthetic control that simulates what would have happened with the target had the intervention not occurred. For example, the synthetic control model 154 may be trained to determine an effect of adding the feature 114 to the module 112A, and the synthetic control may simulate usage of the module 112A if the feature 114 had not been added to it. The synthetic control model 154 may be trained using the sensitivity analysis engine 152.

To train the synthetic control model 154, donors are selected. The donors may be similar to the target but may not have been affected by the intervention. For example, the donors may be modules 112 that are similar to the module 112A but did not have the feature 114 added to them. In the illustrated embodiment, the module 112B and the module 112Z may be selected as donors on which the synthetic control model 154 may be trained. The donors may be selected by a user, or the donors may be selected automatically by the sensitivity analysis engine 152.

The synthetic control model 154 may be trained using timeseries data associated with the selected donors in any way currently known in the art. For example, training the synthetic control model may include determining weights for calculating a weighted average of the donor timeseries data that mirrors the target timeseries data as close as possible during the first period before the intervention. This may be done, for example, using linear regression without intercept and allowing for negative coefficients.

Figure 5:
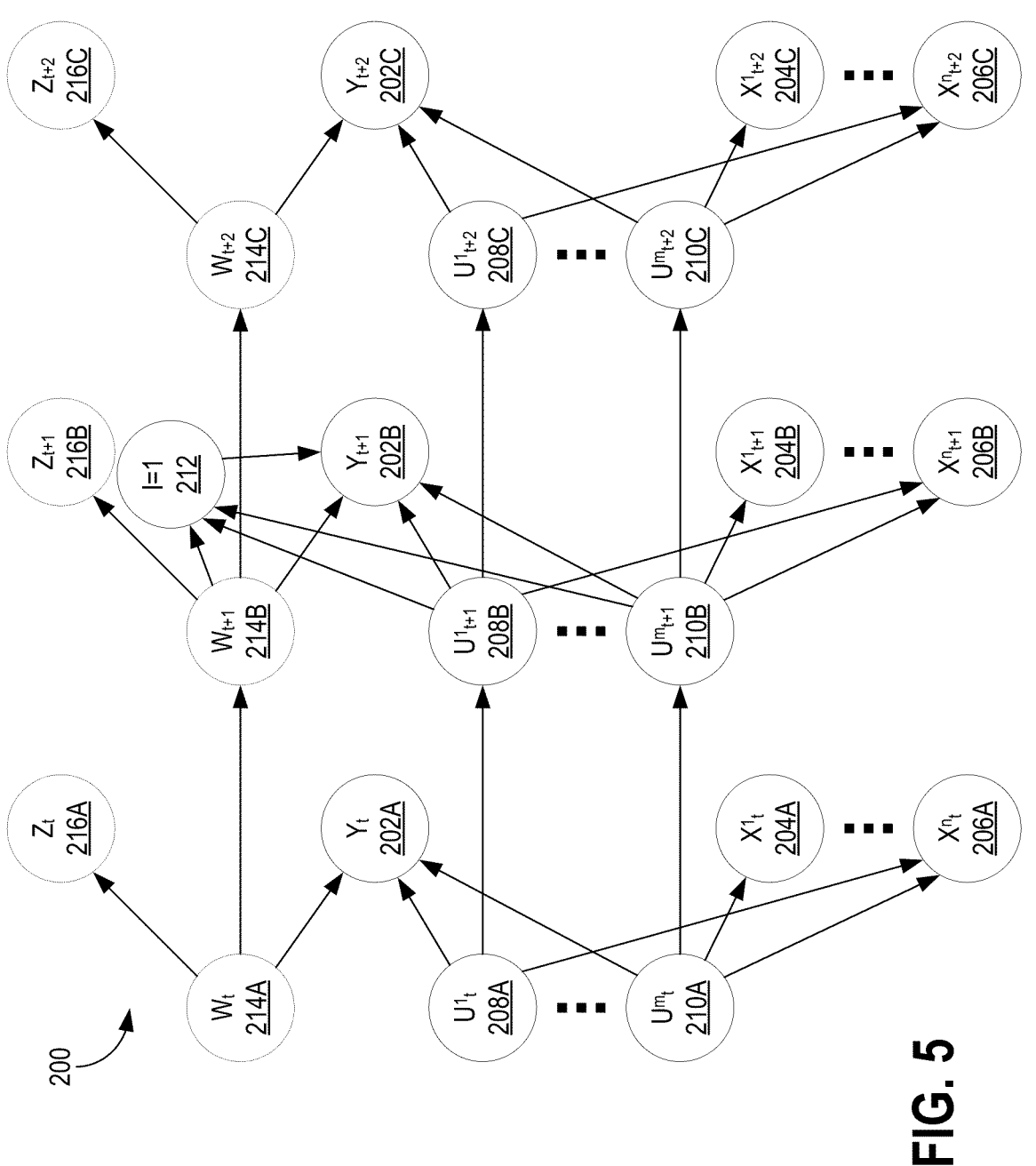
FIG. 5 illustrates an example of a directed acyclic graph on which a synthetic control model may be based.

FIG. 5 illustrates an example embodiment of a directed acyclic graph 200 on which a synthetic control model in a sensitivity analysis engine (such as the synthetic control model 154 in the sensitivity analysis engine 152 of FIG. 4) may be based. The graph 200 includes a plurality of nodes and arrows, with the arrows representing causal effects caused by nodes on other nodes.

Target nodes 202A-C represent a target at various points in time. For example, the target may be usage of a module that receives an additional feature in a media playback application. A first node 202A from this group may represent usage of the module before the additional feature is added, while other nodes 202B-C may represent usage of the module after the additional feature is added.

Donor nodes 204A-C, 206A-C may represent donors at various points in time. As described above, donors may be similar to the target, but may not be affected by an intervention. For example, the donors may be usage data for other modules in the media playback application that do not receive the additional feature. Like with the nodes 202A-C representing the target, the nodes 204A-C, 206A-C may represent the donors at various points in time, both before and after the intervention.

Latent cause nodes 208A-C, 210A-C may represent latent causes. These latent causes are variables that have causal effects on the target and the donors. For example, these nodes 208A-C, 210A-C may represent reasons that users may wish to use the modules of the media playback application. These latent causes may affect both the target nodes 202A-C and the donor nodes 204A-C, 206A-C.

An intervention node 212 may represent the intervention. For example, this may be the addition of the additional feature to the target module in the media playback application. Because the additional feature may only be added to the target module and not to the donor modules, the intervention node 212 may only have a causal effect on the target node 202B and not on the donor nodes 204B, 206B.

Based on the graph 200, a synthetic control model may be trained. However, as described herein, bias may exist in the synthetic control model. For example, there may be bias in the synthetic control model caused by latent causes that affect the target, but do not affect any of the donors. These latent causes may be represented by latent cause nodes 214A-C. The latent causes may also affect an unobserved proxy, represented by unobserved proxy nodes 216A-C. To overcome the bias in the synthetic control model, the synthetic control model may be retrained with the unobserved proxy being added to donors so that the previously unconsidered latent cause is considered in the training of the synthetic control model.

Returning to FIG. 4, once the synthetic control model 154 has been trained, the bias estimator 155 may calculate bias bounds for the synthetic control model 154. The bias bounds may be calculated using data from the synthetic control model 154 based on an assumption that the synthetic control model 154 includes the most important latent cause, and any latent cause not considered when training the synthetic control model 154 will at most be as impactful as the most important latent cause. In an embodiment, the bias bounds are calculated as a product of a number of donors in the synthetic control model 154, a maximum weight in the synthetic control model 154, and a maximum of the average differences in the data from before the intervention and after the intervention (e.g., before the feature 114 was added and after the feature 114 was added to the module 112A) for each donor. In an embodiment, the number of donors used does not include donors in which a weight associated with the donor is zero. Similarly, the average difference in data from before the intervention and after the intervention may not be considered for donors associated with a weight that is zero.

For example, the module 112B and the module 112Z may be selected as donors. After the synthetic control model 154 is trained using the module 112B and the module 112Z, the synthetic control model 154 may include two learned weights with the following values: 2 and 6. Additionally, in a period before the feature 114 was added to the module 112A, the module 112B had an average of 10 minutes of usage and the module 112Z had an average of 8 minutes of usage, and in a period after the feature 114 was added to the module 112A, the module 112B had an average of 11 minutes of usage and the module 112Z had an average of 6 minutes of usage. In this example, the number of donors is 2, the maximum weight in the synthetic control model 154 is 6, and the maximum of the average differences in the data from before the feature 114 was added and after the feature 114 was added to the module 112A for each donor is 2 (average difference for the module 112Z being the difference between 8 and 6). Therefore, in this example the bias bounds would be ±24 minutes.

The bias bounds may be used to determine if the effect of adding the feature 114 to the module 112A determined by the synthetic control model 154 is trustworthy. As briefly described above, if an average difference between an observed outcome and the synthetic control is outside of the bias bounds, the effect determined using the synthetic control model 154 may be trustworthy. Because the average difference between the observed outcome and the synthetic control is outside of the bias bounds, then at every possible bias within the bias bounds, the average difference will always have the same sign. Therefore, even with a worst-case bias, the effect will still be in the same direction.

For example, if the average difference between the observed outcome and the synthetic control is 500 and the bias bounds are ±250, then even with a maximum amount of bias, the average difference between the observed outcome and the synthetic control may be between 250 and 750. In this case, even with the maximum amount of bias, the average difference between the observed outcome and the synthetic control is positive, so a trustworthy positive causal effect may be determined from the synthetic control model 154.

In another example, if the average difference between the observed outcome and the synthetic control is 500, but the bias bounds is ±1000, then the range for the average difference between the observed outcome and the synthetic control may be between −500 and 1500. Because both a positive effect and a negative effect are within the range for the average difference between the observed outcome and the synthetic control, the effect of adding the new feature is indeterminate even though the average difference between the observed outcome and the synthetic control would indicate that the effect is positive.

The bias bounds may also be used to determine if the synthetic control model 154 should be retrained using additional or alternative donors. If the effect determined from the synthetic control model 154 is indeterminate and not trustworthy, it may be because a latent cause affects the target but does not affect any of the donors on which the synthetic control model 154 was trained. In such a case, any causal effect determined using the synthetic control model 154 may be due to a shift in this unconsidered latent cause instead of the intervention (e.g., the addition of the new feature 114). To overcome this, new donors may be selected on which the synthetic control model 154 may be trained, and at least one of these new donors may be affected by the previously unconsidered latent cause. The selection of new donors may be performed automatically, or a user may select the new donors.

Output from the synthetic control model 154 and/or from the bias estimator may be shown on the visual output device 158. Data shown on the visual output device 158 may assist a user in determining that the effect determined form the synthetic control model 154 is trustworthy. In embodiments in which the average difference between the observed outcome and the synthetic control are within the bias bounds, the data displayed on the visual output device 158 may assist the user in determining that new donors should be selected to retrain the synthetic control model 154. Data may also be shown to assist the user in selecting the new donors.

FIGS. 6-15 illustrate examples of data from a synthetic control model and bias estimator displayed on a visual output device. FIGS. 6-10 illustrate data from a first example scenario in which the effect determined using the synthetic control model is not trustworthy, and FIGS. 11-15 illustrate data from a second example scenario in which the effect determined using the synthetic control model is trustworthy.

Figure 6:
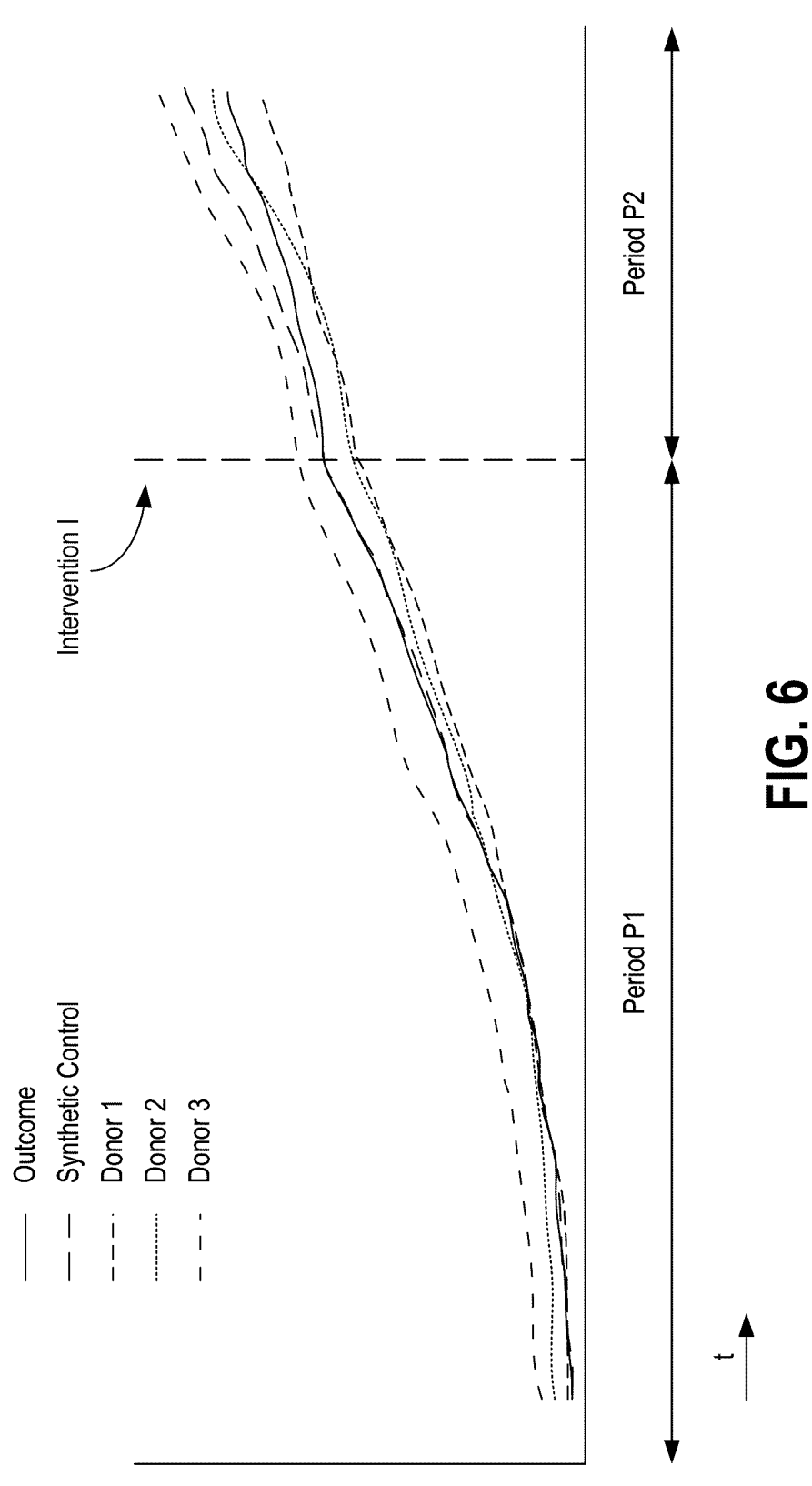
FIG. 6 illustrates a first example graph including data from a synthetic control model in a first scenario

FIG. 6 illustrates a graph of timeseries data that includes data on a true outcome, a synthetic control, and a plurality of donors. The synthetic control may be determined using a synthetic control model (such as the synthetic control model 154 described with relation to FIG. 5). The illustrated graph includes timeseries data from a first period P1 and a second period P2. An intervention I separate the first period P1 and the second period P2. For example, the intervention I could be an addition of an additional feature to a module in a media playback application. This graph illustrates a difference between the synthetic control and the true outcome, particularly during the second period P2 after the intervention I. The graph also illustrates data for the plurality of donors, providing visual insight into how the synthetic control may have been determined.

In alternative embodiments, the graph may include data on proxies that were not included as donors to train the synthetic control model. In such an embodiment, the data on the proxies may be beneficial for selecting a new set of donors if it is determined that the synthetic control is untrustworthy.

Figure 7:
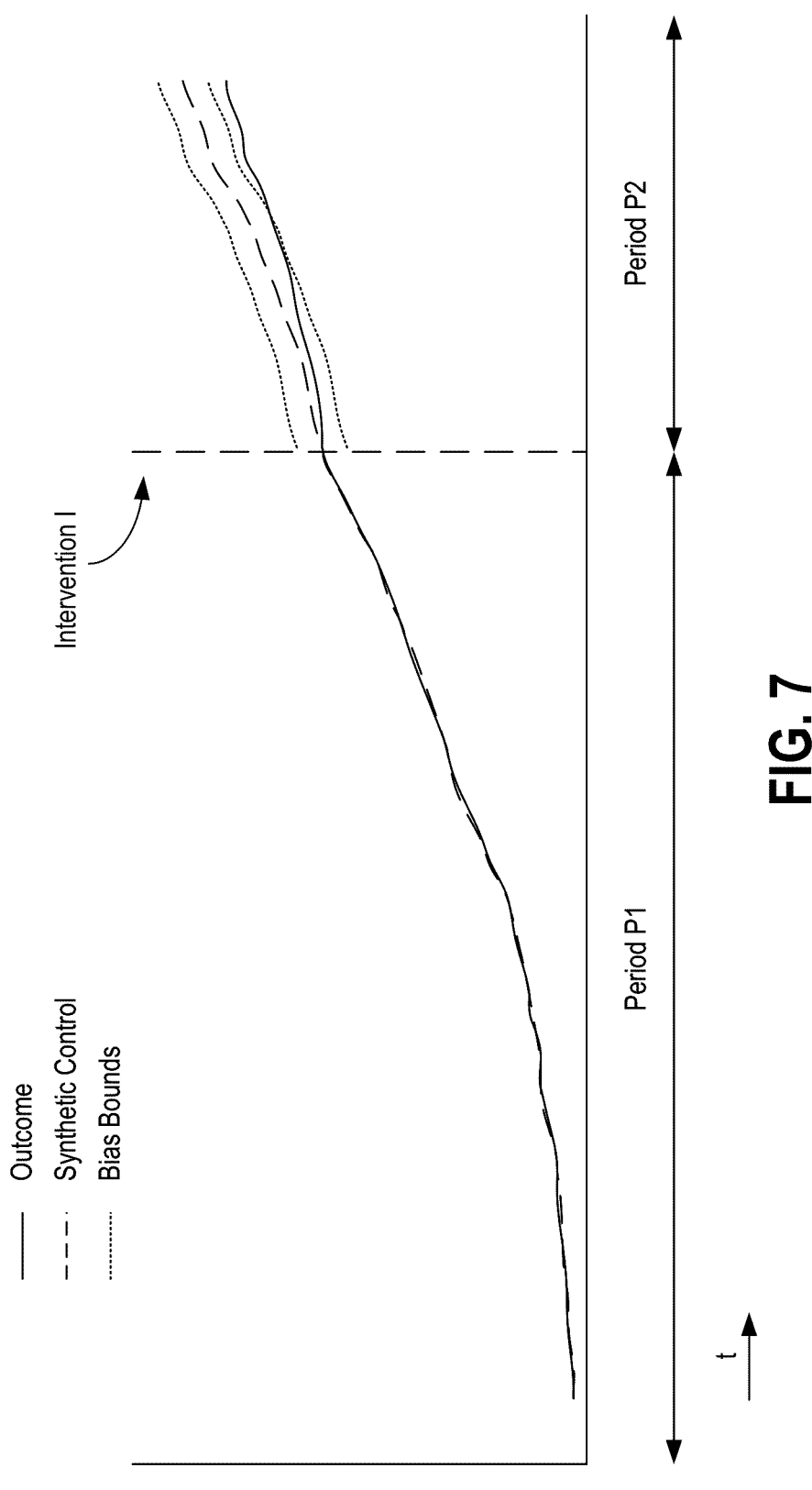
FIG. 7 illustrates a second example graph including data from a synthetic control model in a first scenario.

FIG. 7 illustrates a graph of timeseries data that includes data on a true outcome, a synthetic control, and bias bounds. Like with the graph depicted in FIG. 6, this graph may include data from a first period P1 and a second period P2, the two periods P1, P2 separated by an intervention I.

By visualizing the synthetic control along with the bias bounds, a determination may be made as to whether a causal effect determined using the synthetic control model is trustworthy. This may be done, for example, by determining whether more of the synthetic control is within the bias bounds or outside of the bias bounds during the period P2. If the synthetic control is within the bias bounds more than it is outside of the bias bounds during the period P2, then the effect determined using synthetic control model may be untrustworthy. This is because while the synthetic control is within the bias bounds, any difference between the synthetic control and the true outcome could be due to bias and not due to a causal effect of the intervention I. In the illustrated example in FIG. 7, the synthetic control is within the bias bounds more than it is outside of the bias bounds. Therefore, it may be determined that the effect determined using synthetic control model is untrustworthy.

Figure 8:
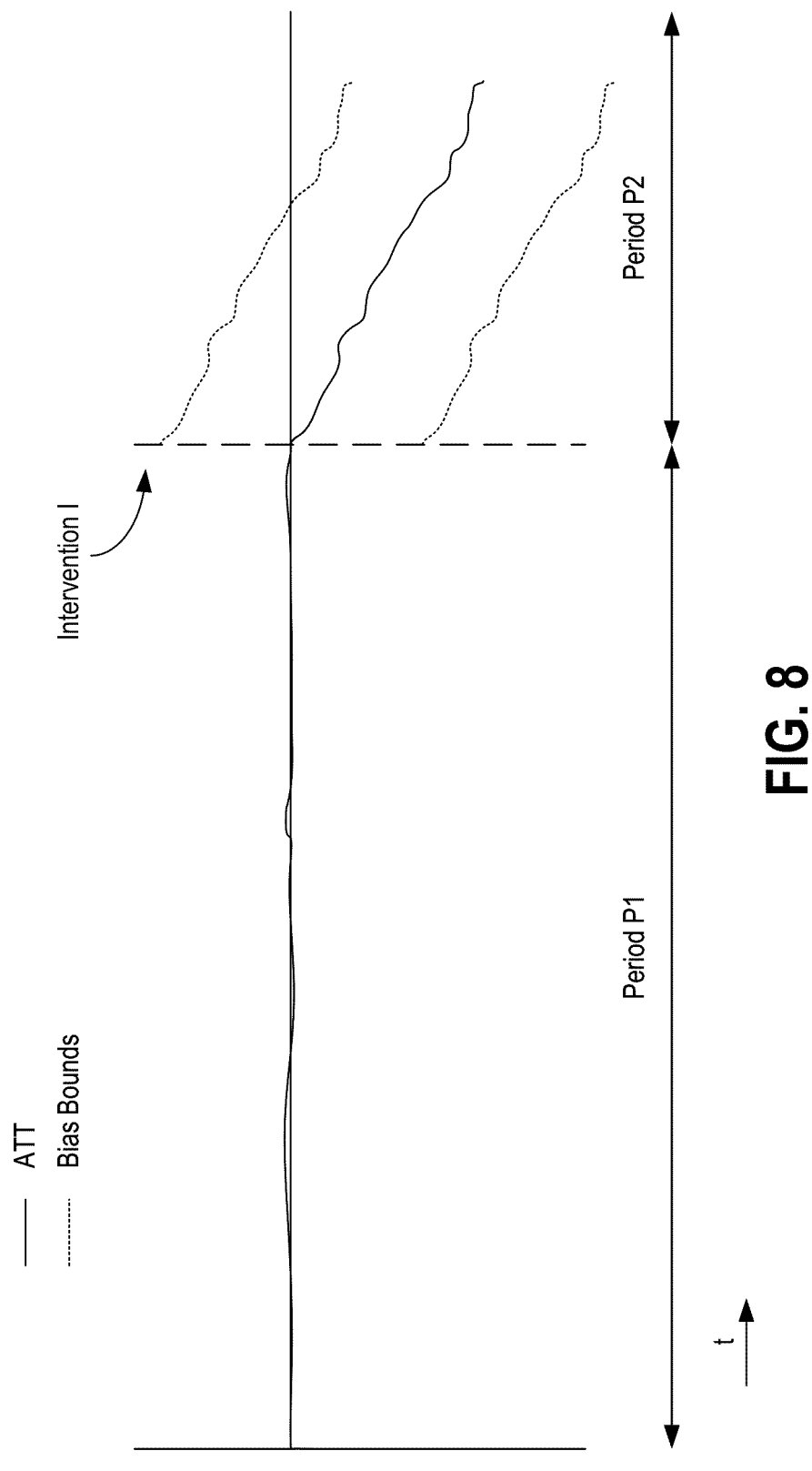
FIG. 8 illustrates a third example graph including data from a synthetic control model in a first scenario.

FIG. 8 illustrates a graph of timeseries data that includes an average treatment effect on treated (ATT) and bias bounds. The ATT may be a difference between a true outcome and a synthetic control. As with the previous example graphs, this graph may include data from a first period P1 and a second period P2, the two periods P1, P2 separated by an intervention I.

This graph may also be used in making a determination of whether a causal effect determined using the synthetic control is trustworthy. This may be done, for example, by determining how long all of the ATT and an upper limit and a lower limit of the bias bounds have the same sign during the period P2. If one of the upper limit or the lower limit of the bias bounds has a different sign than the ATT more than it has the same sign as the ATT during the period P2, then the causal effect determined using the synthetic control may be untrustworthy.

In the illustrated example, the ATT is negative for the majority of the period P2, which may indicate a negative causal effect of the intervention I. However, an upper limit of the bias bounds is positive for a majority of the period P2, which may indicate that the negative causal effect is untrustworthy. This is because with the worst possible bias, the causal effect may actually be positive more than it is negative during the period P2.

Figure 9:
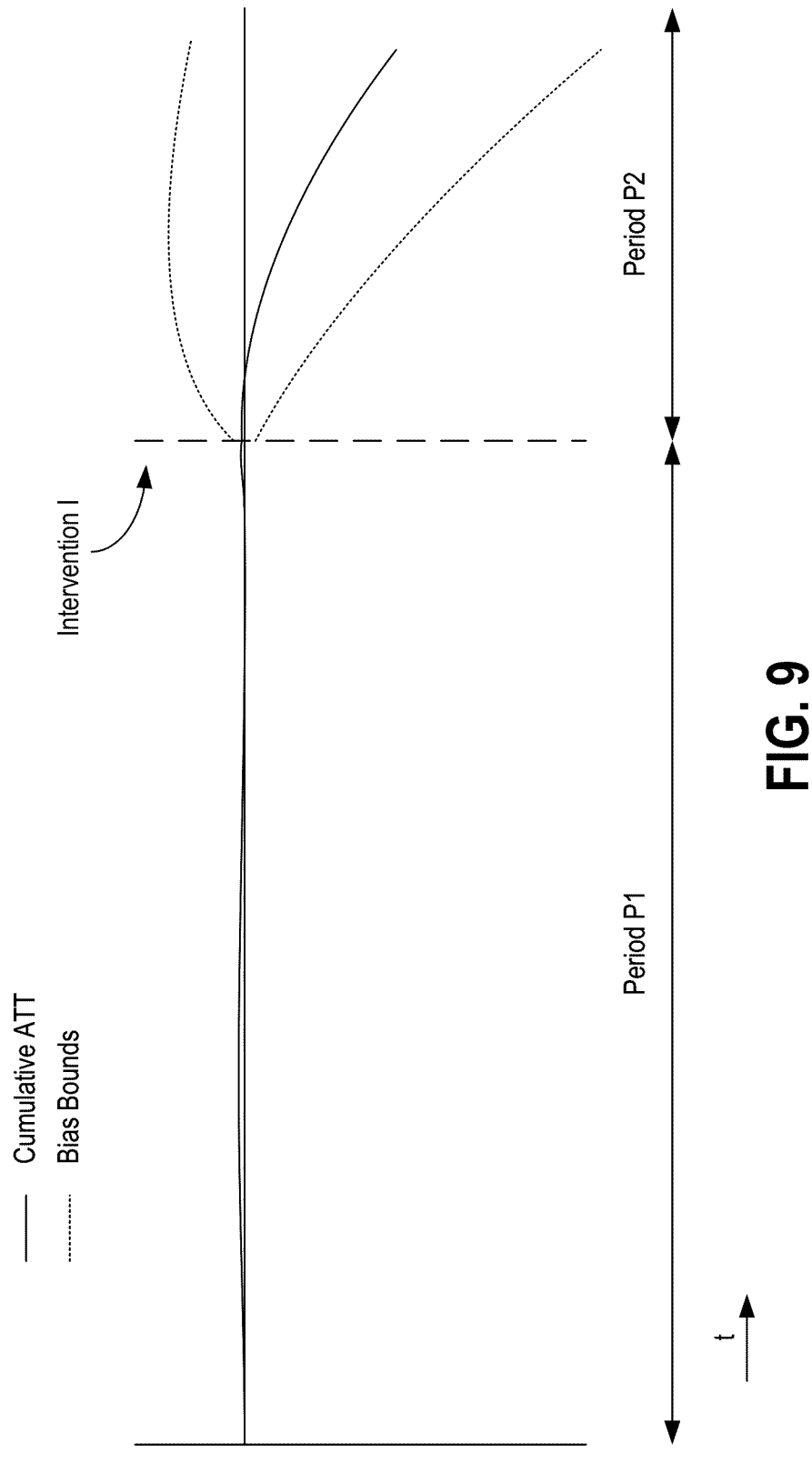
FIG. 9 illustrates a fourth example graph including data from a synthetic control model in a first scenario
Figure 11:
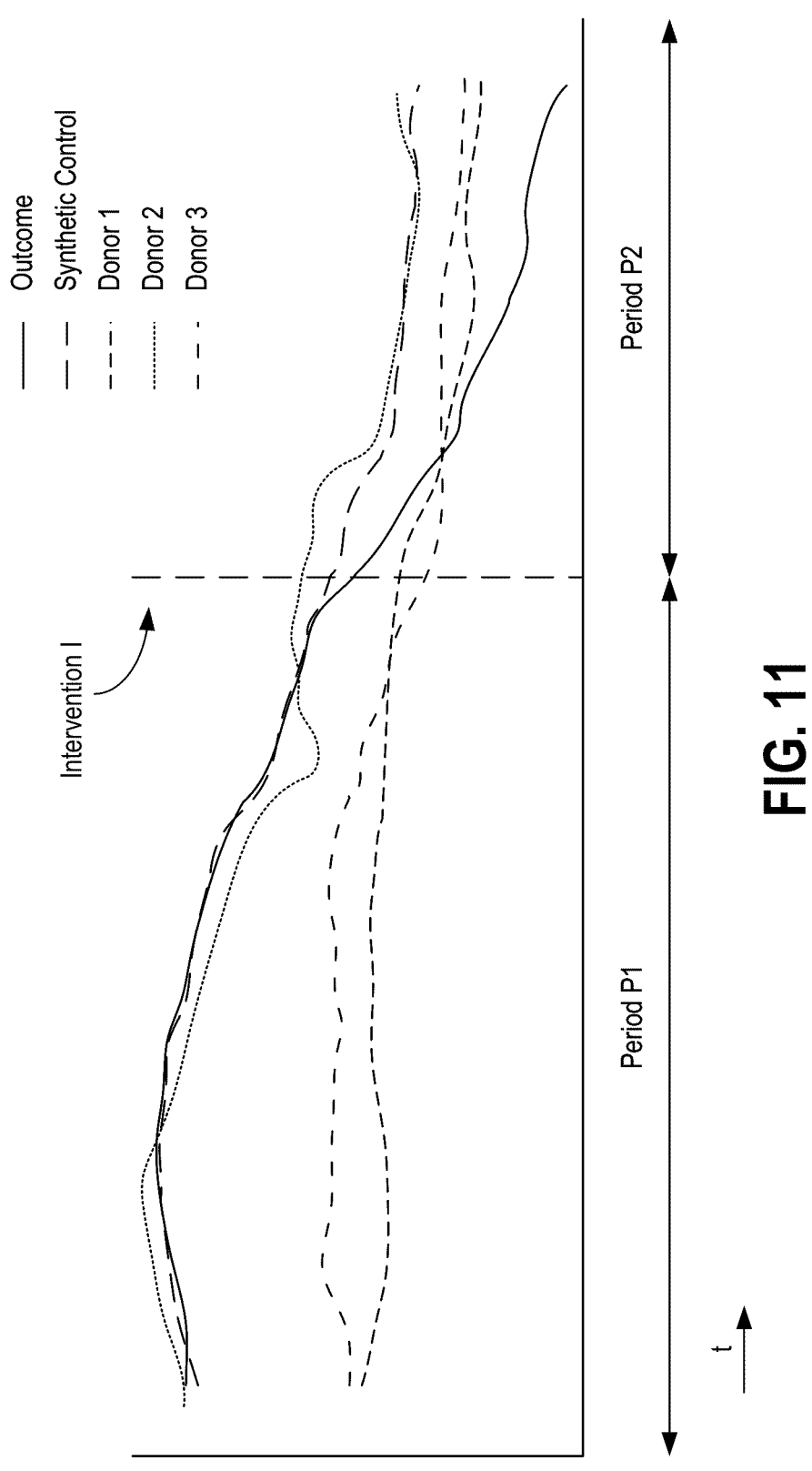
FIG. 11 illustrates a first example graph including data from a synthetic control model in a second scenario

FIG. 9 illustrates a graph of timeseries data that includes a cumulative ATT and bias bounds. The cumulative ATT may represent a sum of all previous values of the ATT. As with the previous example graphs, this graph may include data from a first period P1 and a second period P2, the two periods P1, P2 separated by an intervention I.

As with the other graphs, this graph may be used to determine if a causal effect using a synthetic control model is trustworthy. This may be done by, for example, determining if the cumulative ATT and both an upper limit and a lower limit of the bias bounds all have the same sign at the end of the period P2. If one of the upper limit or the lower limit has a different sign than the cumulative ATT at the end of the period P2, then the causal effect of the intervention I determined using the synthetic control model may be untrustworthy.

In the illustrated example, the cumulative ATT is negative at the end of the period P2, which may indicate a negative causal effect. However, the upper limit of the bias bounds is still positive at the end of the period P2. Therefore, the negative causal effect of the intervention I determined using the synthetic control model may be untrustworthy. This is because with the worst possible bias, the cumulative ATT may be positive rather than negative, so a determination that the causal effect of the intervention I may be untrustworthy.

FIG. 10 illustrates a table of data that includes a number of donors, a maximum weight value, a maximum donor change value, bias bounds, and an average ATT value. As described above, the maximum weight value is a maximum value of weights of a synthetic control model and the maximum donor change is a maximum value of an average difference between pre-intervention and post-intervention data for each donor used in the synthetic control model. The bias bounds may be a product of the number of donors, the maximum weight, and the maximum donor change. The average ATT may be an average difference between a synthetic control and an observed outcome.

The data displayed in the table may be used to determine whether a causal effect determined using the synthetic control model is trustworthy. As explained above, if the average ATT is within the bias bounds, the causal effect may not be trustworthy. In the illustrated example, the average ATT is within the bias bounds, so the causal effect may not be trustworthy.

In alternative embodiments, additional or alternative data may be shown in the table. In further embodiments, only of subset of the data is shown. For example, the table may include the bias bounds and the average ATT, as a determination of whether the causal effect determined using the synthetic control model is trustworthy can be made with only the bias bounds and the average ATT.

While FIGS. 6-10 each illustrate only a single graph or table, in some embodiments, multiple graphs and/or tables may be presented on display (such as visual output device 158 of FIG. 4) for a user.

Figure 12:
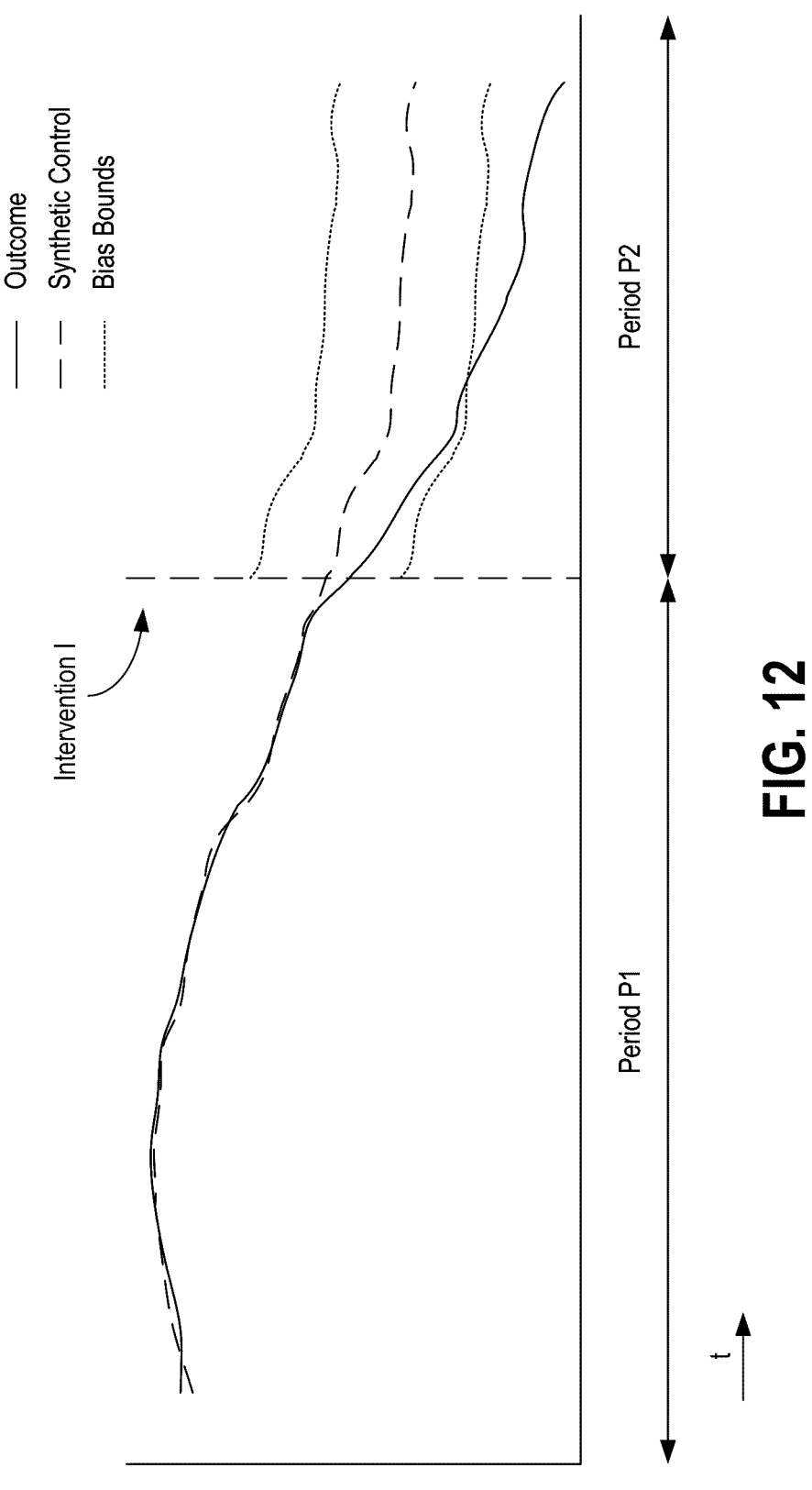
FIG. 12 illustrates a second example graph including data from a synthetic control model in a second scenario.
Figure 13:
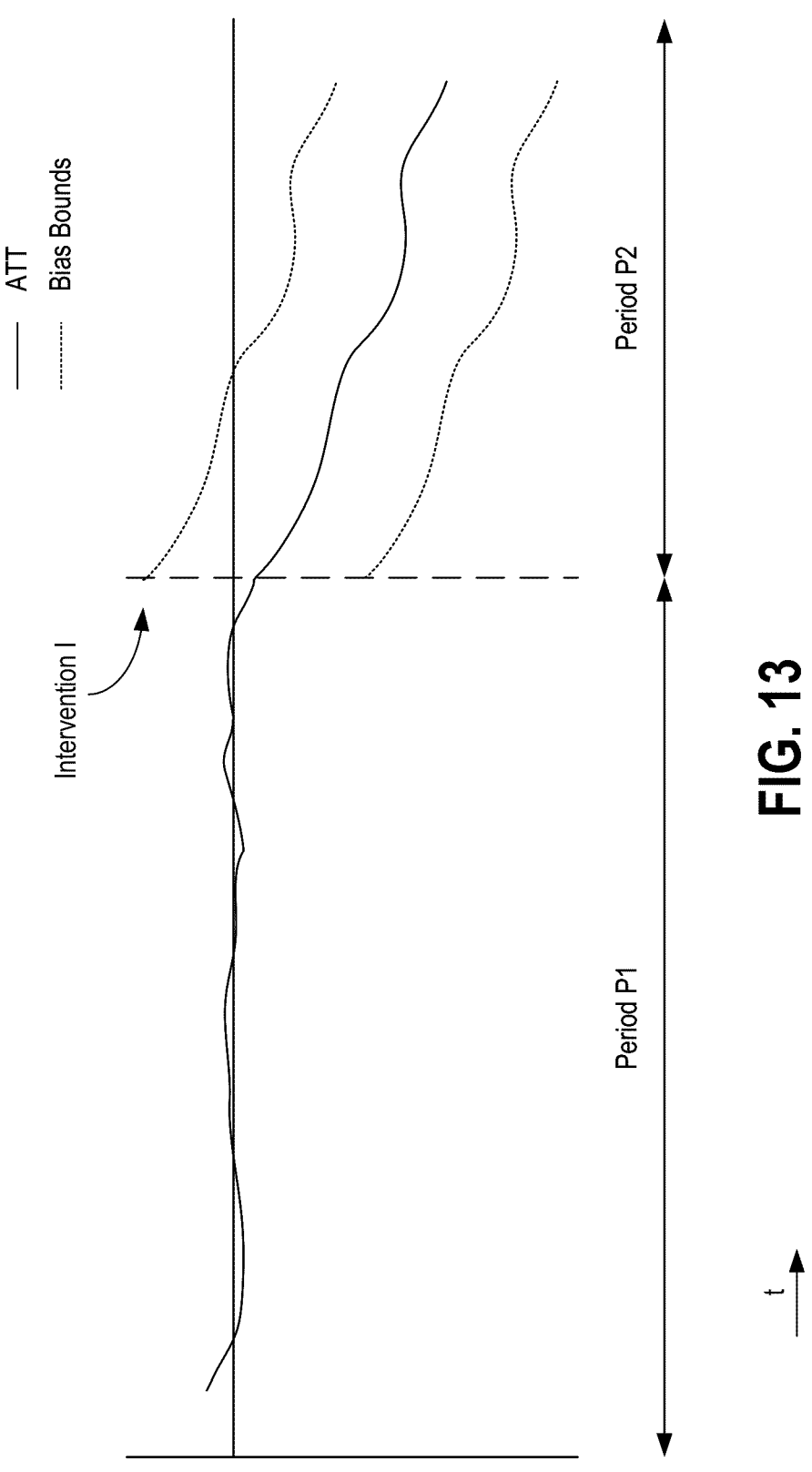
FIG. 13 illustrates a third example graph including data from a synthetic control model in a second scenario.
Figure 14:
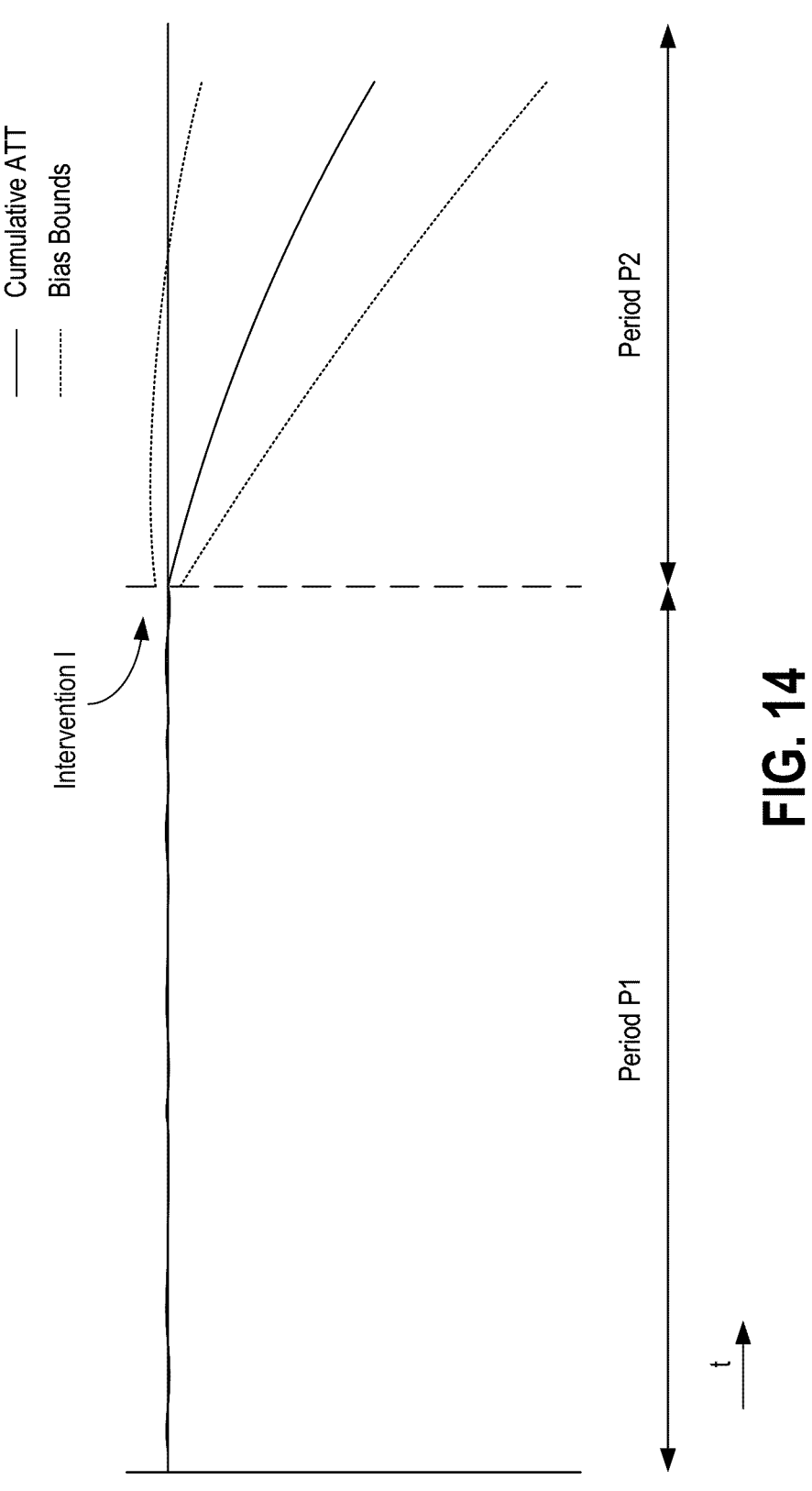
FIG. 14 illustrates a fourth example graph including data from a synthetic control model in a second scenario

Turning to FIGS. 11-15, a second set of example graphs and tables are shown. In this example, as can be seen with the graphs and the table, a causal effect determined using a synthetic control model may be trustworthy. In FIG. 12, a synthetic control is shown to be outside of bias bounds more than it is inside of the bias bounds during a second period P2 after an intervention I, indicating that the causal effect may be trustworthy. In FIG. 13, all of an ATT and an upper limit and a lower limit of the bias bounds are negative for a majority of the period P2, which may also indicate that the causal effect is trustworthy. In FIG. 14, all of a cumulative ATT and the upper and lower limits of the bias bounds are negative at the end of the period P2, which may further indicate that the causal effect may be trustworthy. Finally, as another indication the causal effect is trustworthy, in the table illustrated in FIG. 15, the average ATT is outside of the bias bounds.

Figure 16:
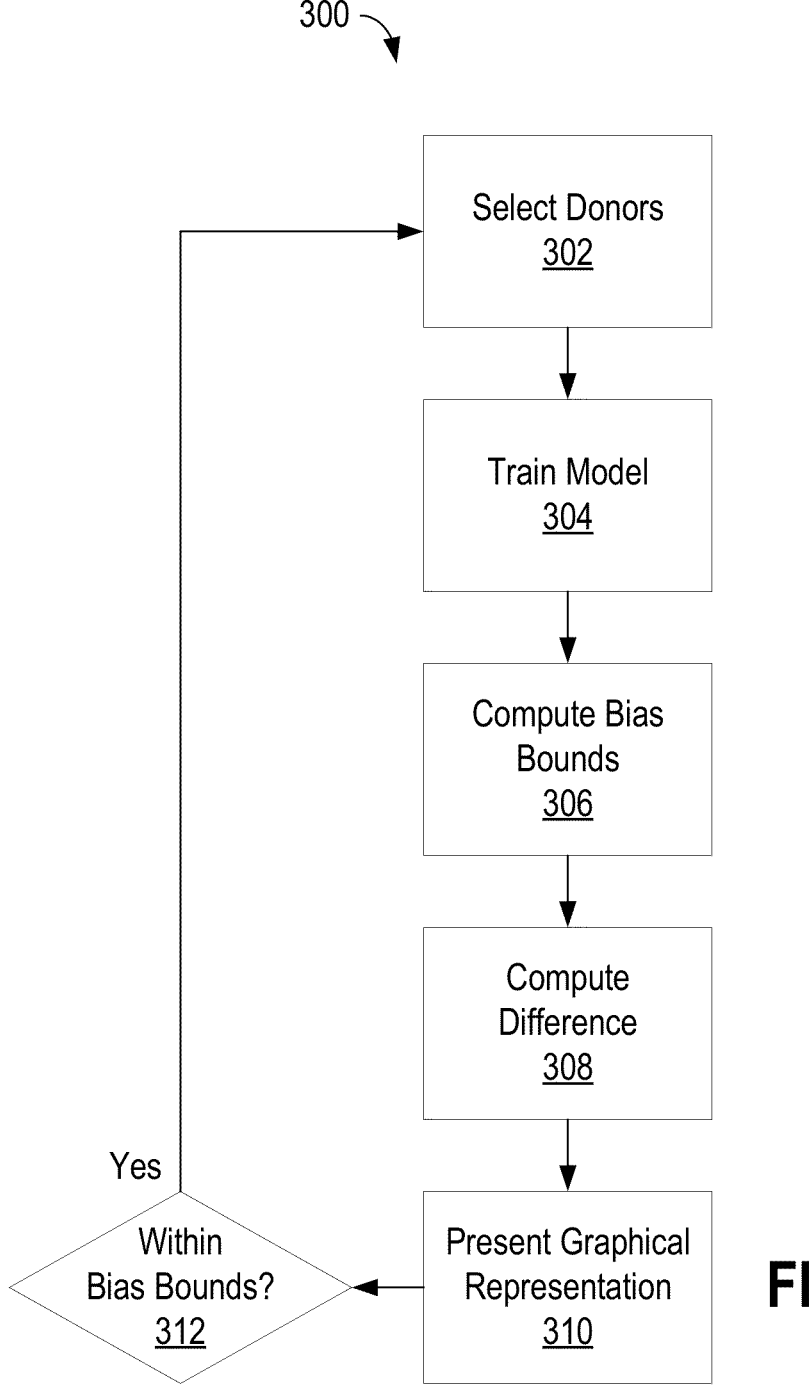
FIG. 16 illustrates a flowchart of an example method for performing bias bounded sensitivity analysis of a synthetic control model.

Referring now to FIG. 16, a flowchart of a method 300 for performing bias bounded sensitivity analysis of a synthetic control model. As explained above, the method 300 may be used, for example, to perform sensitivity analysis of a synthetic control model trained to estimate a causal effect of adding a feature in a media playback application. The method 300 may include operations 302, 304, 306, 308, 310, 312.

The operation 302 is performed to select donors for a synthetic control model. The donors may be selected based on a similarity with a target. The donors may be associated with timeseries data from a first period before an intervention and a second period after the intervention. For example, the donors may be modules in the media playback application that are similar to a target module to which the additional feature was added. In this example, the timeseries data may be data on usage of the modules over time, including data both before and after the additional feature was added to the target module.

In an embodiment, the operation 302 may be performed by a user with a sensitivity analysis engine. The user may manually perform selection of the donors for the synthetic control model and may input the selection to the sensitivity analysis engine. In alternative embodiments, the donors may be automatically selected by the sensitivity analysis engine.

The operation 304 is performed to train the synthetic control model. The synthetic control model may be trained using the timeseries data associated with the donors selected during the operation 302 as well as timeseries data associated with the target. As explained above, training the synthetic control model may include determining weights for calculating a weighted average of the donor timeseries data that mirrors the target timeseries data as close as possible during the first period before the intervention, such as by performing linear regression without intercept and allowing for negative coefficients. In an example, the synthetic control model may estimate the causal effect of adding the additional feature to the target module in the media playback application. In an embodiment, the synthetic control model may be trained by a sensitivity analysis engine.

The operation 306 is performed to compute bias bounds for the synthetic control model. The bias bounds may be computed using data from the synthetic control mode. As explained above, the bias bounds may be calculated as a product of a number of donors in the synthetic control model, a maximum weight in the synthetic control model, and a maximum of the average differences in the timeseries data from the first period and the second period for each donor. In some embodiments, the number of donors for this calculation does not include donors in which a weight associated with the donor is zero. Similarly, the average difference in data from before the intervention and after the intervention may not be considered for donors associated with a weight that is zero. In an embodiment, a bias estimator in a sensitivity analysis engine may compute the bias bounds.

The operation 308 is performed to compute a difference between an observed outcome and a synthetic control of the synthetic control model. The observed outcome may be timeseries data associated with the target during the second period after the intervention, and the synthetic control may be timeseries data during the second period after the intervention that represent what would have happened to the target if the intervention had not occurred. For example, the observed outcome may be the usage data of the target module after the additional feature was added, and the synthetic control may be data that represents what usage of the target module would have been if the feature had not been added. In an embodiment, the calculated difference may be the average difference between the observed outcome and the synthetic control over the second period after the invention. The difference may be computed by a bias estimator in a sensitivity analysis engine.

The operation 310 is performed to present a graphical representation. The graphical representation may be based, at least in part, on the observed outcome, the synthetic control, and the bias bounds. In an embodiment, the graphical representation may include a difference between the observed outcome and the synthetic control, which may be the difference computed during the operation 308. In another embodiment, the graphical representation may include a cumulative difference between the observed outcome and the synthetic control. The graphical representation may include a table and/or a line chart. As described above, FIGS. 6-15 illustrate examples of graphical representations that may be displayed. In an embodiment, the graphical representation may be presented on a visual output device.

The operation 312 is performed to determine whether the difference computed during the operation 308 is within the bias bounds computed during the operation 306. If the difference is within the bias bounds, it may indicate that a causal effect determined using the synthetic control model is untrustworthy. If the difference is outside of the bias bounds, the method 300 may end. However, if the difference is within the bias bounds, the method 300 may return to the operation 302 where a new set of donors may be selected. In an embodiment, the new donors selected may include the donors that were selected the first time the operation 302 was performed as well as additional donors. In alternative embodiments, the new set of donors may not include all of the donors that were selected the first time the operation 302 was performed.

In an embodiment, the operation 312 may be performed by automatically a sensitivity analysis engine. In alternative embodiments, a user may determine whether the difference is within the bias bounds by analyzing the graphical representation displayed during the operation 310.

In alternative embodiments, the operations shown in the example method 300 may be performed in a different order. For example, the operation 308 to compute the difference between the between the observed outcome and the synthetic control may be performed before the operation 306 is performed to compute the bias bounds. In further embodiments, some operations shown in the example method 300 may be performed concurrently. For example, the operation 308 to compute the difference between the between the observed outcome and the synthetic control may be performed at the same time as the operation 306 is performed to compute the bias bounds. Additionally, in some embodiments, some operations shown in the example method 300 may not be performed. For example, the operation 310 may not be performed to present a graphical representation, and the operation 312 to determine whether the difference is within the bias bounds may be performed after the operation 308.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A system for determining a causal effect using a synthetic control model, the system comprising:

one or more processors; and one or more computer-readable storage devices storing data instructions that, when executed by the one or more processors, cause the system to:

receive a selection of one or more donors, each donor in the one or more donors associated with timeseries data comprising data before an intervention and data after the intervention;

train the synthetic control model on the timeseries data associated with the one or more donors, the synthetic control model including one or more learned weights, each learned weight associated with a donor in the one or more donors;

compute a bias for a synthetic control from the synthetic control model, wherein computing the bias includes: selecting a weight from the one or more learned weights; for each donor in the one or more donors, computing a difference between an average of the timeseries data before the intervention and an average of the timeseries data after the intervention; selecting a difference from the computed differences; and computing the bias based on a product of a number of donors in the synthetic control model, the selected weight, and the selected difference; and cause a visual output device of a computing device to present a graphical representation based, at least in part, on an observed outcome, the synthetic control, and the bias.

2. The system of claim 1, wherein the selected weight has a maximum absolute value from among the one or more learned weights.

3. The system of claim 1, wherein the selected difference has a maximum absolute value from among the computed differences.

4. The system of claim 1, wherein the graphical representation includes a difference between the observed outcome and the synthetic control.

5. The system of claim 1, wherein the graphical representation includes a cumulative difference between the observed outcome and the synthetic control.

6. The system of claim 1, wherein the graphical representation includes a table.

7. The system of claim 1, wherein the graphical representation includes a line chart.

8. The system of claim 1, wherein computing the bias is based on performing sensitivity analysis on the synthetic control model to determine trustworthiness of the causal effect.

9. The system of claim 1, wherein the instructions, when executed by the one or more processors, further cause the system to:

compute a difference between the observed outcome and the synthetic control;

determine that the difference is within bounds of the bias; and in response to determining that the difference is within the bounds of the bias, retrain the synthetic control model by selecting one or more further donors, and training the synthetic control model on further timeseries data associated with the one or more further donors.

10. The system of claim 1, wherein the donors comprise donor configurations of a media playback system, wherein the intervention involves adding a configuration with a new feature to the media playback system, and wherein the causal effect is of the new feature in relation to the media playback system.

11. A method for determining a causal effect using a synthetic control model, the method comprising:

receiving a selection of a first one or more donors, each donor in the first one or more donors associated with timeseries data comprising data before an intervention and data after the intervention;

training the synthetic control model on the timeseries data associated with the first one or more donors, the synthetic control model including one or more learned weights, each learned weight associated with a donor in the first one or more donors;

computing bias bounds for a synthetic control from the synthetic control model, wherein computing the bias bounds includes: selecting a weight from the one or more learned weights; for each donor in the first one or more donors, computing a difference between an average of the timeseries data before the intervention and an average of the timeseries data after the intervention; selecting a difference from the computed differences; and computing the bias bounds based on a product of a number of donors in the synthetic control model, the selected weight, and the selected difference; and causing a visual output device of a computing device to present a graphical representation based, at least in part, on an observed outcome, the synthetic control, and the bias bounds.

12. The method of claim 11, wherein the selected weight has a maximum absolute value from among the one or more learned weights.

13. The method of claim 11, wherein the selected difference has a maximum absolute value from among the computed differences.

14. The method of claim 11, further comprising:

after causing the visual output device of the computing device to present the graphical representation, receiving a selection of a second one or more donors associated with timeseries data before the intervention and after the intervention and retraining the synthetic control model on the timeseries data associated with the second one or more donors.

15. The method of claim 14, wherein the second one or more donors includes at least one donor from the first one or more donors.

16. A non-transitory computer-readable medium having stored thereon instructions that, when executed by one or more processors, cause the one or more processors to:

receive a selection of one or more donors, each donor in the one or more donors associated with timeseries data comprising data before an intervention and data after the intervention;

train a synthetic control model on the timeseries data associated with the one or more donors, the synthetic control model including one or more learned weights, each learned weight associated with a donor in the one or more donors;

compute bias bounds for a synthetic control from the synthetic control model, wherein computing the bias bounds includes: selecting a weight from the one or more learned weights; for each donor in the one or more donors, computing a difference between an average of the timeseries data before the intervention and an average of the timeseries data after the intervention; selecting a difference from the computed differences; and computing the bias bounds based on a product of a number of donors in the synthetic control model, the selected weight, and the selected difference; and cause a visual output device of a computing device to present a graphical representation based, at least in part, on an observed outcome, the synthetic control, and the bias bounds.

17. The non-transitory computer-readable medium of claim 16, wherein the selected weight has a maximum absolute value from among the one or more learned weights.

18. The non-transitory computer-readable medium of claim 16, wherein the selected difference has a maximum absolute value from among the computed differences.

19. The non-transitory computer-readable medium of claim 16, wherein the graphical representation includes a difference between the observed outcome and the synthetic control.

20. The non-transitory computer-readable medium of claim 16, wherein the graphical representation includes a cumulative difference between the observed outcome and the synthetic control.

\* \* \* \* \*